Oct. 12, 1971   C. F. STEARNS   3,611,719
FUEL CONTROL

Filed July 12, 1968   3 Sheets-Sheet 1

INVENTOR
CHARLES F. STEARNS

BY *Norman Friedland*

ATTORNEY 3,611,719
FUEL CONTROL
Charles F. Stearns, East Longmeadow, Mass., assignor to United Aircraft Corporation, East Hartford, Conn.
Filed July 12, 1968, Ser. No. 744,395
Int. Cl. F02c 9/08
U.S. Cl. 60—39.28
13 Claims

ABSTRACT OF THE DISCLOSURE

Fuel flow to a turbine type of powerplant is scheduled by varying the pressure drop across the metering valve of a fuel control. The total hydraulic computing circuit pressure drop is varied by maintaining the pressure drop across a portion of the circuit at a constant value and varying the pressure drop across the other portion of the circuit between a minimum and maximum value. The hydraulic circuit senses certain engine operating parameters and computes these variables into a scheduled ratio of fuel flow to engine pressure.

BACKGROUND OF THE INVENTION

This invention relates to fuel controls and more particularly to fuel controls for a turbine type of powerplant.

As is well known in the art, a fuel control for a jet engine serves to regulate the flow of fuel to the burner so as to support combustion in an efficient and economical manner. It also assures that the engine is operating within its tolerable operating regimes whereby rich and lean blowouts do not ensue and engine acceleration is accomplished in minimum time while holding temperature within the structural integrity of the component parts and preventing pressure to surge in the compressor section. In the main, the engine operating variables that have been utilized as most efficacious have been compressor discharge pressure or compressor inlet pressure, compressor speed, compressor inlet temperature and/or compressor inlet pressure.

A typical fuel control senses these parameters and computes them into a scheduling signal which takes the form of a $W_f/P$ ratio, where $W_f$ is fuel flow in pounds per hour and P is either compressor inlet pressure (CIP) or compressor discharge pressure (CDP). This scheduled signal is then multiplied by actual CDP or CIP to provide a fuel flow.

The acceleration schedule in the heretofore known fuel controls is imposed on a three dimensional cam that is actuated by compressor speed and compressor inlet temperature whereby the output signal limits the fuel flow to prevent overtemperature and surge.

Patent No. 3,307,352 granted on Mar. 7, 1967, entitled "Fuel Control" discloses and claims another type of fuel control that utilizes the same parameters as the type described above, but among other things eliminates the three dimensional cam. However, in the fuel control disclosed in the 3,307,352 patent the computed scheduled parameter takes a different form than the typical $W_f/P_3$ ratio parameter.

The fuel control described in this invention utilizes the $W_f/P_3$ scheduled parameter and eliminates the three dimensional cam but the means in which the control achieves these results distinguishes over the teachings described in the prior art. In this concept the control employs means whereby $W_f/P_3$ ratio scheduling is accomplished by varying the pressure drop across the metering valve. In this arrangement the fuel control consists of a computing circuit sensing the engine operating variables, establishing a pressure in the computing circuit in accordance with sensed parameters and regulating the pressure drop across a portion of the computing circuit at a predetermined value. This, in turn, varies the pressure drop across the throttle valve in accordance with this combined pressure drop control and computing circuit system in order to produce a scheduled $W_f/P_3$ ratio.

SUMMARY OF THE INVENTION

A primary object of the present invention is to provide a simplified fuel control for a small turbine type of powerplant.

In accordance with the present invention a hydraulic computing circuit responding to engine operating parameters and a pressure regulating valve maintaining the pressure drop across a portion of the computing circuit at a predetermined value serves to vary the pressure drop across the throttle valve in order to provide a scheduled $W_f/P_3$ ratio signal.

Orifice flow equation:
$$W_f = KA\sqrt{\Delta P}$$
Let
$$KA = P_3$$
and
$$\sqrt{\Delta P} = \frac{W_f}{P_3}$$
then
$$W_f = P_3\left(\frac{W_f}{P_3}\right)$$

($W_f/P_3$ is scheduled as a function of the $\sqrt{\Delta P}$ in order to obtain a linear multiplication)

DESCRIPTION OF THE PREFERRED EMBODIMENT

Figure 1:
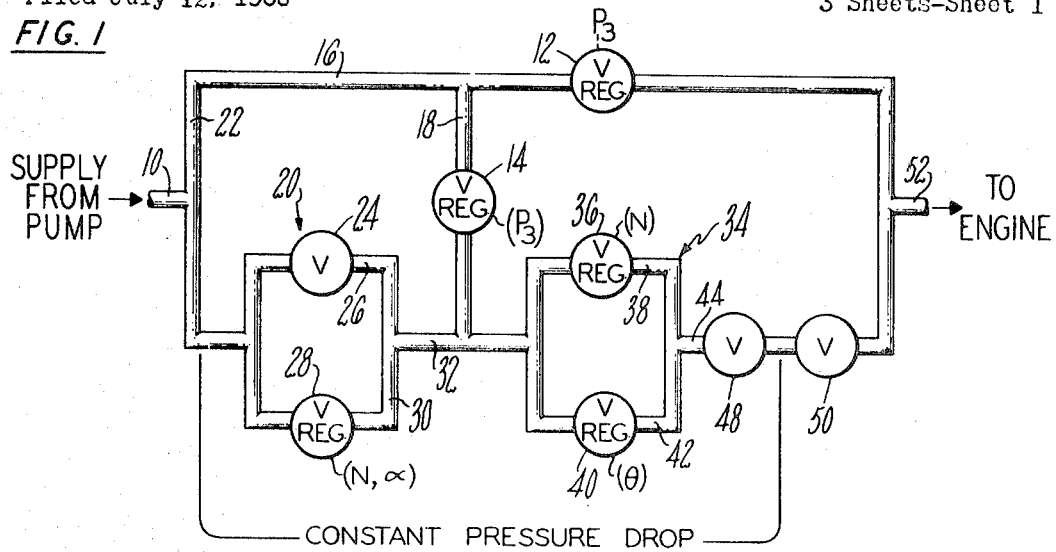
FIG. 1 is a schematic illustration showing the operating principles of the present invention.
Figure 2:
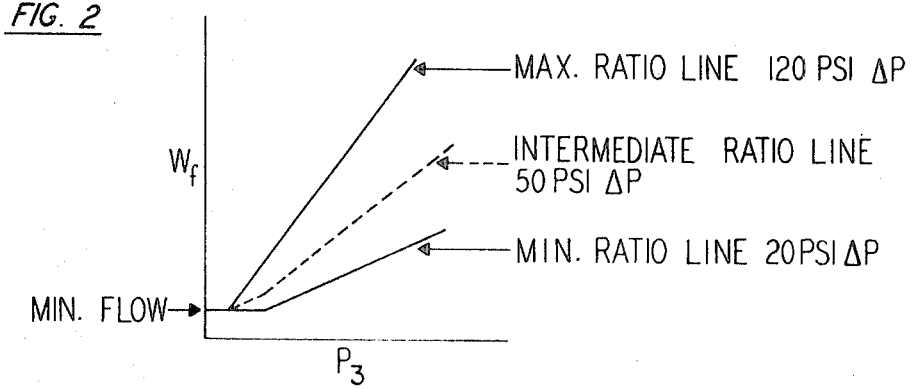
FIG. 2 is a graphical illustration of fuel flow versus compressor discharge pressure graphically describing the functioning of the scheduled control.

This invention can probably best be understood by referring to FIGS. 1 and 2 of the drawings. As noted from FIG. 1 the hydraulic circuit consists of a plurality of fixed and variable restriction valves disposed in a hydraulic circuit interconnecting the pump and the engine. Flow from the pump in line 10 is divided to feed variable restriction valves 12 and 14 via line 16 and branch line 18 and the droop computing circuit generally illustrated by numeral 20 via line 22. The steady state droop circuit comprises a pair of parallel restrictions 24 disposed in line 26 and variable restriction valve 28 disposed in line 30, which communicate with common line 32. Variable restriction valve 28 varies as a function of speed (N) and the power lever position ($\alpha$).

Variable restriction valve 14 varies as a function of compressor discharge pressure and also communicates with common line 32 which in turn communicates with the acceleration computing circuit generally illustrated by numeral 34.

The acceleration computing circuit comprises variable restriction valve 36 disposed in line 38 and variable restriction valve 40 disposed in line 42 both communicating with line 44. Variable restriction valve 36 varies as a function of the compressor speed and variable restriction valve 40 varies as a function of compressor inlet temperature for defining a limit for allowing the engine to accelerate without encountering adverse conditions.

A pair of spaced fixed restrictions 48 and 50 are disposed in line 44 which delivers fuel to the engine via line 52.

As noted from FIG. 1, the pressure drop between a point just downstream of valve 48 and a point upstream of the steady state computing circuit 20 is held at a constant value by a pressure regulating valve not shown. Hence, the pressure drop across the metering valve 12 is made up of say 20 p.s.i. maintained by the regulator plus an additional pressure drop across fixed orifice 50. Various elements in the computing circuit represented by the circuit indicated by numerals 20 and 34 define an effective area which is a function of their individual areas. This effective area in conjunction with the constant regulated head determines the flow across the lower portion of the circuit. As this circuit flow changes, the pressure drop across orifice 50 changes. The result is that the pressure drop across the metering valve 12, which is the sum of the regulated 20 p.s.i. head plus the pressure drop across the orifice 50, is varied as a function of the elements of the computing circuit.

In this manner $w_f/P_3$ is varied as a linear function of fuel flow. This can be seen by referring to FIG. 2 which shows graphically a plot of fuel flow versus compressor discharge pressure. As noted, each line represents a constant value of ratio units, that is, $W_f/P_3$, where the lowest line represents minimum ratio or lowest value of ratio units which can be scheduled and the highest line represents the maximum ratio or the highest value of ratio units which can be scheduled. The former condition is achieved when the computer circuit flow is low so that essentially no pressure drop is occurring across orifice 50 and as a result, metering valve pressure drop consists only of the 20 p.s.i. regulated head from the pressure regulating valve. As individual components in the computing circuit increase their area resulting in a total effective area increase, the circuit flow increases resulting in some intermediate ratio line. The intermediate ratio unit line shown in FIG. 2 results from a pressure drop across orifice 50 of 30 p.s.i. which when added to the constant 20 p.s.i. regulated head results in a metering valve pressure drop of 50 p.s.i. In the same manner the maximum ratio unit line is the result of maximum total effective area of the computing circuits. Thus, from the foregoing it is apparent that the pressure drop across metering valve 12 consists of the sum of the constant regulated head 20 p.s.i. plus the drop across the orifice 50 which can obtain 100 p.s.i. Thus, the maximum p.s.i. across the metering valve 12 can be 120 p.s.i. and the minimum can be 20 p.s.i.

Hence, by scheduling the pressure drop across the orifice of metering valve 12 and moving it linearly in conjunction with a sensed engine operating variable, say the compressor discharge pressure ($P_3$), the scheduled ratio units, that is, $W_f/P_3$, can therefore be multiplied by $P_3$ in order to obtain the required engine fuel flow.

Minimum fuel flow scheduling is accomplished by the inclusion of variable valve 14 which responds to compressor discharge pressure and serves to prevent fuel flow from decreasing below a preselected minimum value in the following manner. As compressor discharge pressure is decreased along the minimum ratio lines as shown in FIG. 2, valve 14 remains closed until such time as the desired minimum flow value is reached. At this time orifice valve 14 opens adding flow to the computing circuit which results in an increase in metering valve pressure drop holding fuel flow to the prescribed minimum value.

Figure 3:
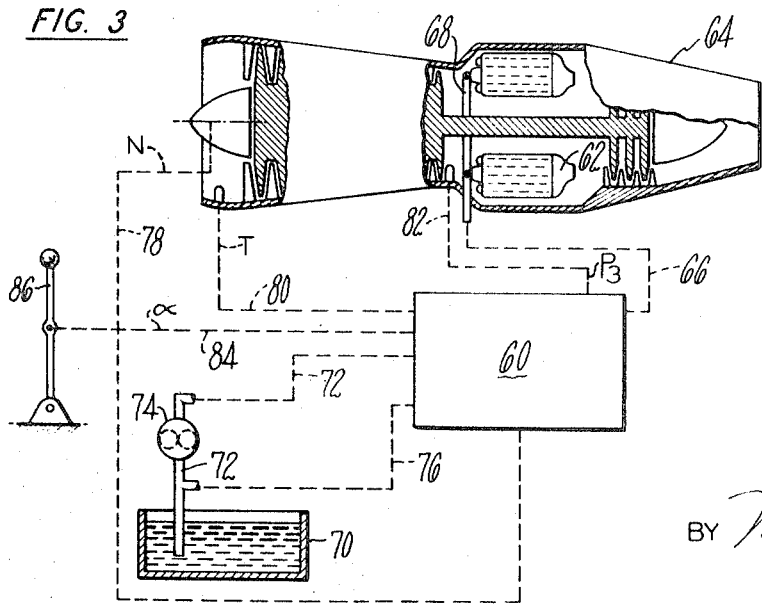
FIG. 3 is a schematic illustrating the relationship of the fuel control and the jet engine.

A typical application for this invention is shown in FIG. 3 where the fuel control shown in the blank box generally illustrated by reference numeral 60 meters fuel to burners 62 of jet engine 64 via fuel metering line 66 and the manifold 68. Fuel is delivered to the fuel control from a suitable fuel tank or reservoir 70 via line 72 where it is pressurized by a pump schematically shown by numeral 74. The return line upstream of the pump 74 interconnects fuel control 60. The parameters sensed by the fuel control are compressor speed via line 78, compressor inlet temperature via line 80, compressor discharge pressure via line 82 and the power lever position via connection 84.

While this invention is not limited in use with a particular type of engine, it is however most suitable for a low power class of engines and affords the advantage of being simple, low cost and reliable. As noted from FIG. 4, the fuel control comprises four major component parts. These four major components include pressure regulating valve generally indicated by numeral 100, and inlet temperature sensor generally indicated by numeral 102, a combined speed sensor and power lever function valve generally indicated by numeral 104, and the combined compressor discharge pressure sensor and metering valve generally indicated by numeral 106. While the specification makes reference to compressor discharge pressure, it is well known that burner pressure is an equivalent of and may be equally substituted therefor.

As is typical in fuel controls, the fuel control usually comprises a metering section and a computation section. However, in the present invention, the fuel used in the hydraulic computation system is combined with the fuel in the metering system prior to being delivered to the engine burners. This results in the realization of a smaller pump than would heretofore be utilized.

Figure 4:
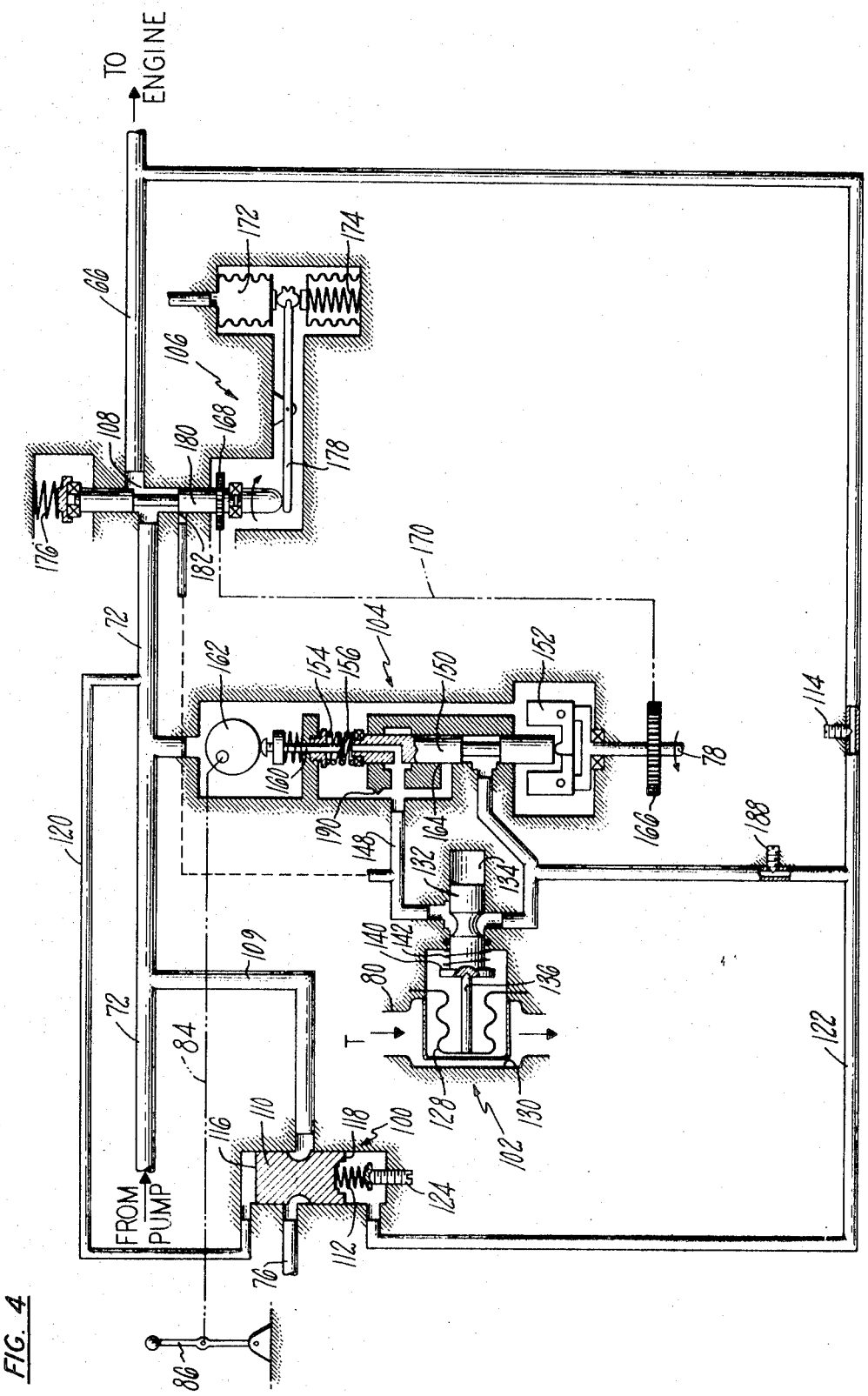
FIG. 4 is a schematic partly in section illustrating the details of the present invention.

As seen from FIG. 4, fuel delivered from the pump in line 72 is conducted to the metering valve 108 and is delivered to the engine via line 66. The pressure drop across the metering valve is controlled by the hydraulic computation circuit to be described hereinbelow.

One of the major components of the computing circuit is pressure regulating valve 100 comprising metering valve element 110 and adjustable spring 112 which serves to bypass a portion of fuel upstream of the metering valve 108 via line 109 and line 76 so as to maintain the pressure drop upstream of fixed orifice 114 and metering valve 108 at a constant value. Valve element 110 carries a pair of opposing pressure reaction surfaces 116 and 118 and pressure from line 72 just upstream of valve 108 is fed to reaction surface 116 via line 120 and pressure upstream of orifice 114 is fed to act on reaction surface 118 via line 122. Since the reaction areas 118 and 116 are equal, the force created by spring 112 determines the value of the pressure drop and in this illustration the force from spring 112 is adjusted via the adjusting screw 124 so as to maintain the pressure drop at a value of 20 p.s.i. Hence, valve element 110 will adjust to bleed fuel from line 109 to maintain this pressure at the regulated value. Thus it is obvious that the minimum pressure from the pump is always at a value sufficient to maintain the pressure drop at least at the 20 p.s.i. value controlled by pressure regulating valve 100.

The second major component is inlet temperature sensor which consists of a bellows 128 disposed in chamber 130. Air bled from the engine via line 80 surrounds liquid encapsulated at one end of bellows 128 so as to be in indirect heat exchange relation causing the fluid to expand and contract as a function of temperature. This in turn translates bellows 128 which positions spool 132 of valve 134. Pin 136 suitably mounted on the end wall of bellows 128 bears against the end of spool 132. Spring 142 serves to load valve 132 against pin 136. Thus, flow through line 148 is regulated as a function of compressor inlet temperature via spool valve 132.

The third major component is a speed sensor which consists of rotating pilot valve 150 positioned by the force output of rotating flyballs 152 suitably connected to the engine via connection means 78. This force output is taken out at the other end of valve 150 by spring 154 such that valve 150 is displaced as a function of the square of input speed. On the top end of the valve as shown in FIG. 4 flapper valve 156 is opened and closed as a function of speed. The flapper valve gap is also reset as a function of power lever angle as a result the motion of plunger 160 bearing against cam 162 actuated by power lever 86. Flapper valve 156 provides the governing function or droop line schedules in the control. It can be seen that at a fixed position of power lever 86 with speed below the desired governing level, flapper valve 156 offers no restriction; however, as speed increases and valve 150 translates up, flapper valve 156 closes, restricting flow with its subsequent effect of decreasing flow in the computing circuit. This, as previously explained, reduces metering valve pressure drop which cuts back ratio units in accordance with the desired engine drop line slope (see FIG. 5). As power lever angle is increased, the speed at which the governing droop line cuts in is increased.

A second function handled by speed sensor 104 is a reset of scheduled ratio units with speed in accordance with the acceleration limiting schedule. With reference to the unit schedule representation shown in FIG. 5, it is noted that at 70% speed the limiting schedule indicated by lines 170 is reset upward up to 80% speed where it levels out again. This is accomplished by window 164 on the speed valve 150 which opens at 70% speed increasing computation circuit flow and consequently scheduled ratio units. This window continues opening up to 80% speed where the area remains at a constant value with further increases in speed and the schedule again flattens out.

The last major component is metering valve 108 consisting of rotating spool 180 directly connected to shaft 76, gears 166, 168 and connection shown by dash line 170 and is translated linearly with a $P_3$ input from a tandem bellows motor 172 and evacuated $P_3$ sensing bellows assembly 174. This references the pressure to an absolute value. Valve 108 provides a linear fuel flow vs. $P_3$ input relationship over the range of pressure drops imposed across the valve from minimum to maximum ratio. The valve is preloaded with spring 176 against the $P_3$ input lever 178.

In addition to the through flow metering capability, the valve provides an additional metering land 180 to schedule the minimum flow. This, as explained above, is accomplished by bleeding metered flow into the scheduling direct to raise metering valve pressure drop at the required rate to maintain metered flow at the preselected minimum level. This flow is bled off the metered circuit through window 182. Window 182 is set to open at the correct flow level and to meter flow to the scheduling circuit at the required rate to maintain the proper pressure drop across the metering valve to hold minimum flow.

The controls uses two adjustable fixed orifices 114 and 188 and one fixed orifice 190 in the hydraulic computation portion of the schematic in order to obtain the desired pressure drops across metering valve 106. The required range of area variation is provided to set the desired schedules as noted above.

OPERATION

Figure 5:
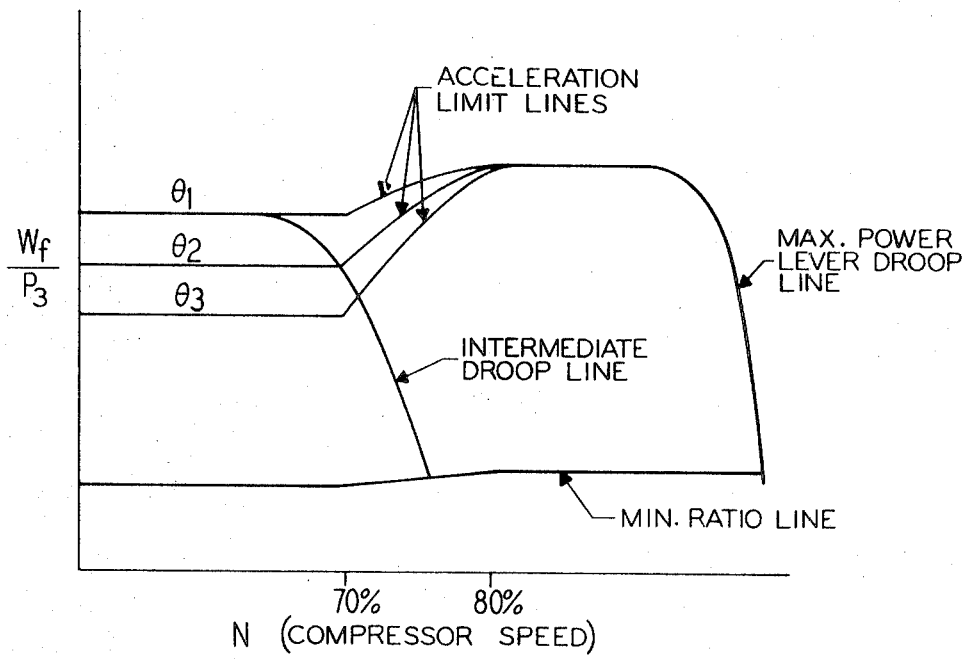
FIG. 5 is a graphical illustration of the fuel control and engine operating characteristics.

The operation of starting, acceleration, governing and deceleration of the engine is presented hereinbelow. Reference is made to FIGS. 4 and 5.

Engine light off and starting is accomplished on a constant ratio unit line which is maintained up to 70 percent speed. This level of ratio units is biased by compressor inlet temperature and by sensor 102 which provides a variable series area in the computing circuit as a function of compressor inlet temperature.

As the engine continues to accelerate along this constant ratio unit schedule, assuming maximum power has been called for by power lever 86, speed increases until 70 percent speed is reached. At this time, speed sensor valve 104 which has been translating with speed opens up a window in parallel with the temperature bias circuit. With the programmed increase in circuit flow with opening of this window, increased pressure drop across fixed orifice 114 results in increased metering valve $\Delta P$. This causes an increase in scheduled ratio units with increasing speed up to 80 percent speed. At 80 percent speed no further increase in area occurs and the scheduled value of ratio units remains constant with further increasing speed. Temperature bias may or may not be scheduled at this level depending on the relative sizing of the speed function area and the temperature function area. Speed will continue to increase along this acceleration limiting line until the system approaches desired speed. At this point, spool valve 150 is close enough to plunger 160 to begin restricting flow through this circuit. With further increasing speed, flapper 156 gradually closes off, reducing flow in the computing circuit and reducing metering valve $\Delta P$. This reduces fuel flow with speed at a scheduled rate to provide the required droop line until the engine stabilizes out at the insertion of this droop line with the engine required to run line.

Assuming at this time a decrease in power is called for by the power lever, the power lever set plunger 160 moves down pushing the speed valve down closing off both the F(N) and F(N,α) flow paths (see FIG. 1). With the resulting reduced circuit flow, minimum ratio is scheduled causing the unit to decelerate along this scheduled value of ratio units until the new lower droop line is reached. At this time, flapper 156 begins to open again, increasing circuit flow, metering valve $\Delta P$, and consequently ratio units. Deceleration continues up along the new droop line until intersection with the required to run line is again reached.

Hence, considering the fuel control shown in FIG. 4 in comparison of the schematic shown in FIG. 1, it can be seen that the following elements are the equivalents:

| FIG. 1: | FIG. 4 |
| --- | --- |
| 14 | 182 |
| 24 | 190 |
| 28 | 156 |
| 36 | 164 |
| 40 | 132 |
| 48 | 188 |
| 50 | 114 |
| 12 | 108 |

From the foregoing it will be appreciated that the computing circuit varies the pressure drop across the metering valve so as to schedule $W_f/P_3$ for acceleration, deceleration and on-speed governing and that actual $P_3$ is multiplied out so that the resultant fuel flow is the product of the scheduled ratio times the actual $P_3$.

It should be understood that the invention is not limited to the particular embodiments shown and described herein, but that various changes and modifications may be made without departing from the spirit or scope of this novel concept as defined by the following claims.

I claim:

1. A fuel control for a turbine type powerplant having a compressor section, a burner section and turbine section driven by the gases emanating from the burner section, comprising in combination, fuel metering means responsive to a first engine operating parameter, control means responsive to a second engine operating parameter including a hydraulic computing circuit disposed in parallel flow relation to the fuel metering means for varying the pressure drop as a function of said second parameter across said fuel metering means to multiply said first and second engine operating parameters to obtain the desired fuel flow, said control means including means for maintaining the pressure drop across said hydraulic computing circuit at a constant value.

2. A fuel control as claimed in claim 1 wherein said second engine operating parameter is compressor speed, said hydraulic computing circuit having a first valve means disposed in parallel flow relation to said fuel metering means and communicating with said burner section, means responsive to said compressor speed for varying the area of said first valve means.

3. A fuel control as claimed in claim 2 wherein said hydraulic computing circuit includes second valve means disposed in series flow relation to said first valve means, and means responsive to the temperature at the inlet of said compressor for varying the area of said second valve means.

4. A fuel control as claimed in claim 3 wherein said hydraulic computing circuit includes third valve means disposed in series flow relation to said second valve means, a pilot lever, means operatively connected to said pilot lever for varying the area of said third valve means.

5. A fuel control for a turbine type powerplant having a burner section comprising a source of fuel, connection means from said source to said burner section, a fuel metering valve in said connection means for regulating the flow therethrough, and control means responsive to a first powerplant operating variable for controlling said fuel metering valve, said control means including hydraulic computing means responding to other powerplant operating variables, pressure drop regulating means maintaining the pressure drop across a portion of said hydraulic computing means at a constant value, and said portion of said hydraulic computing means regulating the pressure drop across the remaining portion of said hydraulic computing means so as to combine said powerplant operating variables to schedule fuel flow through said fuel metering means by varying the pressure drop thereacross.

6. A fuel control for a turbine type of powerplant having a compressor, a burner and a turbine driven by the gases of said burner driving said compressor, comprising:
   a source of fuel under pressure,
   first connecting means interconnecting said source and said burner,
   second connection means disposed in partiallel flow relation to said first connecting means interconnecting said source and said burner,
   fuel regulating means disposed in said first connecting means for regulating the flow therein,
   a fixed restriction disposed in said second connecting means,
   scheduling means for scheduling fuel flow in accordance with engine operating variables by varying the pressure drop across said fuel regulating means,
   said scheduling means including a plurality of valve means responding to said engine operating variables upstream of said fixed restriction,
   pressure regulating means for maintaining the pressure drop across said plurality of valve means at a constant value whereby the pressure drop across said fixed restriction varies through a predetermined pressure drop range.

7. A fuel control as claimed in claim 6 wherein said plurality of valve means includes a first and second valve means disposed in parallel flow relation for controlling the droop schedule, said first valve means being responsive to compressor speed.

8. A fuel control as claimed in claim 7 including a pilot lever, said first valve means also being responsive to the position of said pilot layer.

9. A fuel control as claimed in claim 7 wherein said plurality of valve means includes third and fourth valve means disposed in parallel flow relation for controlling fuel during engine acceleration, said third valve means being responsive to compressor speed.

10. A fuel control as claimed in claim 9 wherein said fourth valve means responds to compressor inlet temperature.

11. A fuel control as claimed in claim 10 including means for controlling the minimum fuel flow, said means including a variable area orifice varying as a function of the pressure value downstream of said compressor.

12. A fuel control as claimed in claim 6 wherein the position of said fuel regulating means is controlled by an engine operating variable.

13. A fuel control as claimed in claim 12 wherein said engine operating variable is a pressure value downstream of said compressor.

References Cited

UNITED STATES PATENTS

| | | | |
|---|---|---|---|
| 2,644,513 | 7/1953 | Mock | 60—39.28 |
| 2,705,047 | 3/1955 | Williams et al. | 60—39.28 |
| 2,720,752 | 10/1955 | Chandler et al. | 60—39.28 |
| 2,855,029 | 10/1958 | Eastman | 60—39.28 |
| 2,950,597 | 8/1960 | Clarke | 60—39.28 |
| 2,971,575 | 2/1961 | Williams | 60—39.28 |
| 3,074,472 | 1/1963 | Williams | 60—39.28 |

A. LAWRENCE SMITH, Primary Examiner